United States Patent [19]
Stanley et al.

[11] 3,727,119
[45] Apr. 10, 1973

[54] SERVO CONTROLLED AUTOMATIC INSPECTION APPARATUS

[75] Inventors: William W. Stanley; Harry L. Hosterman, both of Akron; Edwin R. Rader, Tallmedge, all of Ohio

[73] Assignee: Information Development Corporation, Akron, Ohio

[22] Filed: Feb. 1, 1971

[21] Appl. No.: 111,532

[52] U.S. Cl. ................................... 318/568, 318/578
[51] Int. Cl. .............................................. G05b 19/42
[58] Field of Search ..................... 318/576, 577, 578, 318/568

[56] References Cited

UNITED STATES PATENTS

| | | | |
|---|---|---|---|
| 3,164,909 | 1/1965 | Rosenberg | 318/568 X |
| 2,996,348 | 8/1961 | Rosenberg | 318/568 X |
| 3,366,934 | 1/1968 | Kelsey | 318/568 X |
| 3,373,267 | 3/1968 | Swann | 318/568 X |
| 3,391,392 | 7/1968 | Doyle | 318/568 X |
| 3,473,157 | 10/1969 | Little et al. | 318/568 X |
| 3,519,905 | 7/1970 | Little et al. | 318/568 |
| 3,302,209 | 1/1967 | Fengler | 318/577 X |
| 2,559,575 | 7/1951 | Fryklund et al. | 318/578 X |
| 3,449,742 | 6/1969 | Stapleton | 318/578 X |
| 3,457,484 | 7/1969 | Shimizu et al. | 318/578 |

*Primary Examiner*—T. E. Lynch
*Attorney*—Oldham & Oldham

[57] ABSTRACT

This invention relates to an automatic inspection apparatus which utilizes a computer along with a digital servo system and a system of probe control which interlocks the servo system with a data register and the computer to provide surface readout information in digital form for any surface, but preferably a surface having orthogonal dimensional relationships.

3 Claims, 8 Drawing Figures

PATENTED APR 10 1973

INVENTORS
EDWIN R. RADER
HARRY L. HOSTERMAN
WILLIAM W. STANLEY

BY
Oldham & Oldham
ATTORNEYS

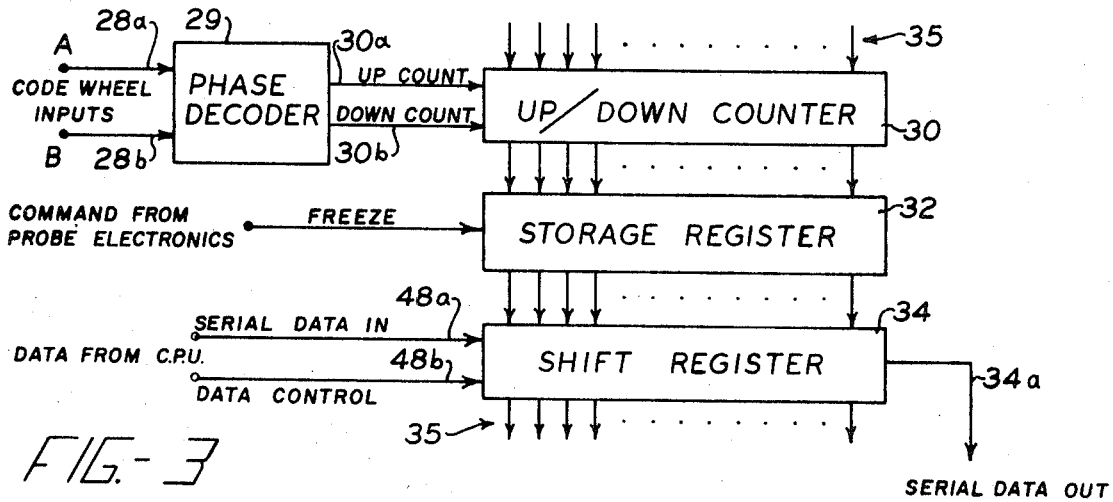
FIG.-3
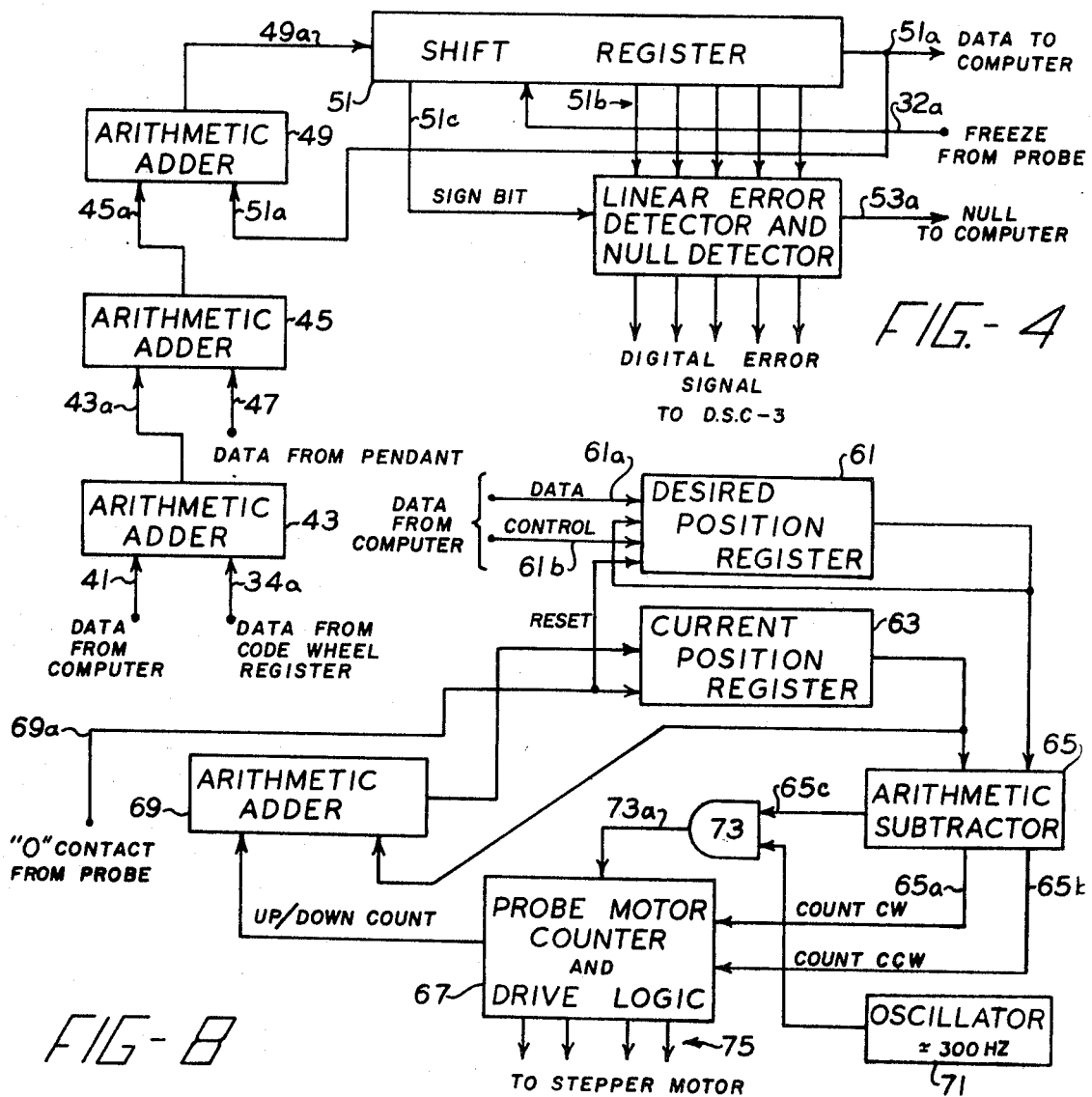
FIG.-4
FIG.-8

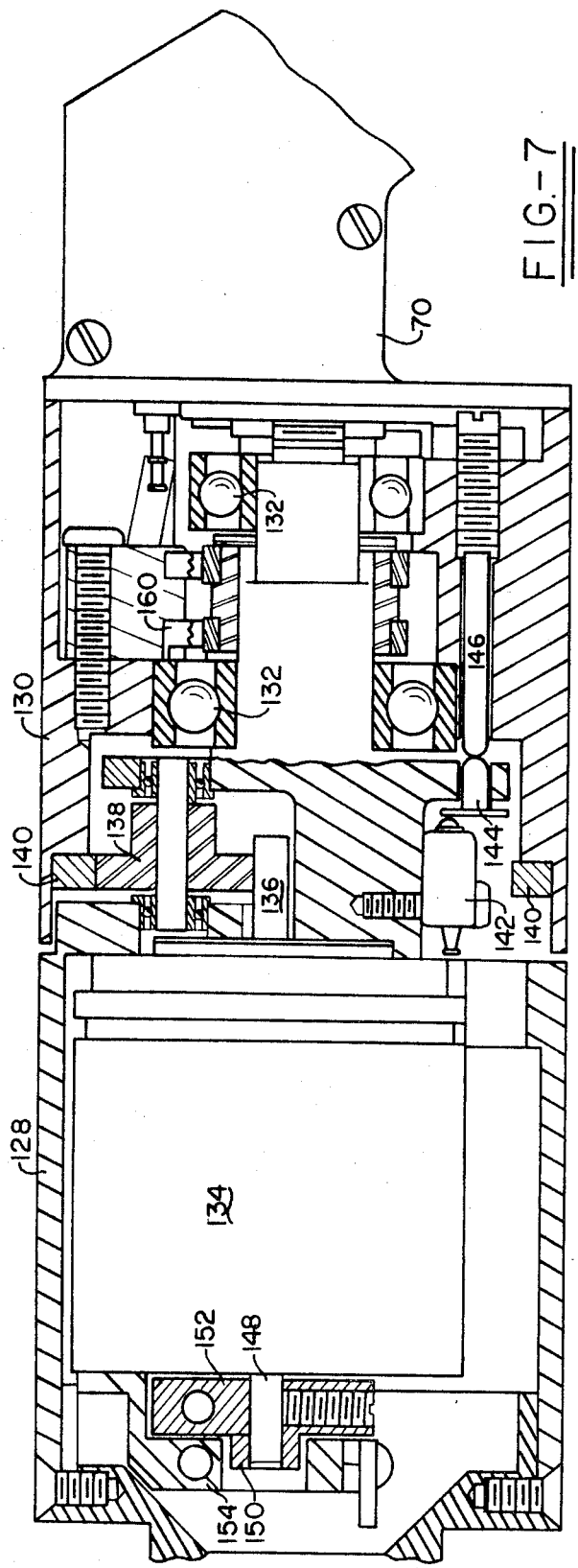

3,727,119

SERVO CONTROLLED AUTOMATIC INSPECTION APPARATUS

Heretofore it has been known that there have been many and various types of inspection apparatus, and particularly devices for performing this inspection manually or automatically to effect measurement of surfaces and an indication of tolerance accuracy quickly and with minimum manpower requirements. However, these prior art systems and apparatus have been subject to error in readout, complex configuration, expense, and not a significant reduction in total manpower requirements to do the same job manually.

The system of the invention is capable of automatically scanning the surface of a three-dimensional model after initial operating conditions have been established at the main control panel. Coordinate data that is generated from surface scanning is then printed out to indicate tolerance variations from predetermined tolerance requirements.

The operation of the system is under complete computer control in that the computer can both monitor manual operations and store the information necessary to repeat the "taught" inspection program, thus creating a self-programming inspection system where an unskilled technician may create sophisticated computer inspection programs.

An important feature of the equipment design is to allow for servicing and control of all electronics by the computer. Console controls, servo positioning controls, axis display registers, increment limit registers, etc., are all addressable by the computer and in fact are utilized in the system as though they are peripheral devices.

A further important feature in the invention is the probe itself and its ability to read out accurately to extremely high tolerance upon engagement of an orthogonal surface in either the vertical or horizontal direction. In effect, a two direction probe is thereby utilized.

For a more complete understanding of the invention and the objects and advantages thereof, reference should be had to the following detailed description and accompanying drawing wherein there is shown a preferred embodiment of the invention.

In the drawing:

FIG. 3 is a schematic diagram of the code wheel register of FIG. 2;

FIG. 4 is a schematic diagram of the digital servo control circuit of FIG. 2;

FIG. 7 is an elevational sectional view of the probe head rotating means; and

FIG. 8 is a schematic diagram of the probe control circuit.

GENERAL SYSTEM APPROACH

Figure 1:
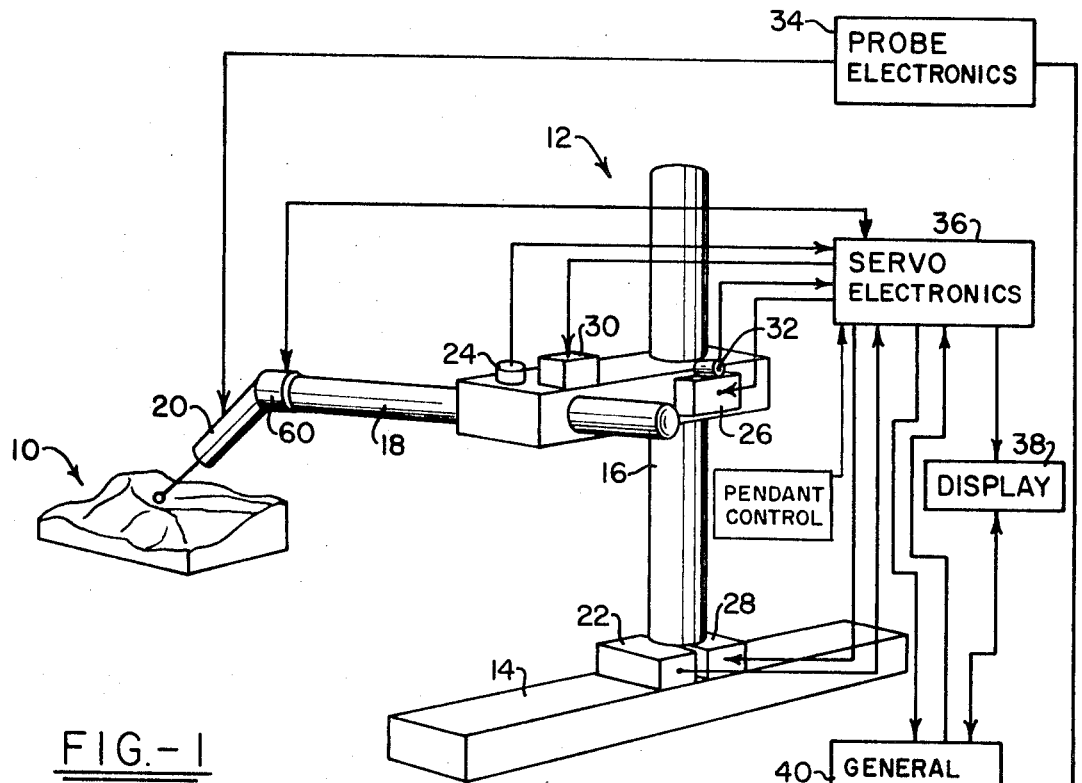
FIG. 1 is a block diagram of the overall system of the automatic inspection apparatus of the present invention.

In FIG. 1 the reference numeral 10 designates generally an object which it is desired to inspect for tolerance and precision of manufacture. The numeral 12 designates generally a layout device which may be of conventional construction, for example, a layout device manufactured by the Portage Machine Company of Akron, Ohio. Such a layout device has a base 14, a mast 16 which is movable linearly along the base, and an arm 18 which is movable linearly relative to the mast 16 and also relative to the base 14. The movement of the mast and arm assembly along the base 14 is designated here as movement along the X axis while movement of the arm relative to the mast is designated as movement in the Y axis and movement of the arm along the mast and relative to the base 14 is designated as movement in the Z axis. These three axes define an orthogonal coordinate system. Mounted at the end of the arm 18 is a probe assembly 20. Suitable servo drive motors 22-26 are provided for effecting movement along the X, Y, and Z axes, respectively. Optical incremental decoders 28-32 are also provided to indicate movement along each of the axes. These optical incremental encoders may be the type manufactured by Trump-Ross of Billerica, Massachusetts. Each of the incremental decoders 28-32 is of the type which provides a pulse of electrical energy to indicate displacement. Hence, for example, each pulse might indicate 0.00025 inches of motion along one of the axes.

The probe 20 provides an input to the probe electronics 34 to produce an indication of the point where the probe 20 makes contact with the model surface 10. The servo electronics 36 control the operation of the servo drive motors 22-26. As will be explained in more detail below, the servo electronics section 36 is controlled by a general purpose digital computer 40 and by the optical incremental encoders 28-32 to precisely read out the point of contact indication by the probe 20. Outputs of the computer and servo electronics 36 are combined and supplied to a display device 38 which may include a NIXIE type readout to display the coordinates of the probe point 20 relative to a fixed reference point.

The digital computer 40 may be a conventional computer and is controlled by suitable controls 42. The computer is also connected to input/output equipment 44 which may include a typewriter keyboard and other peripheral equipment as needed.

OVERALL SYSTEM CONFIGURATION

Figure 2:
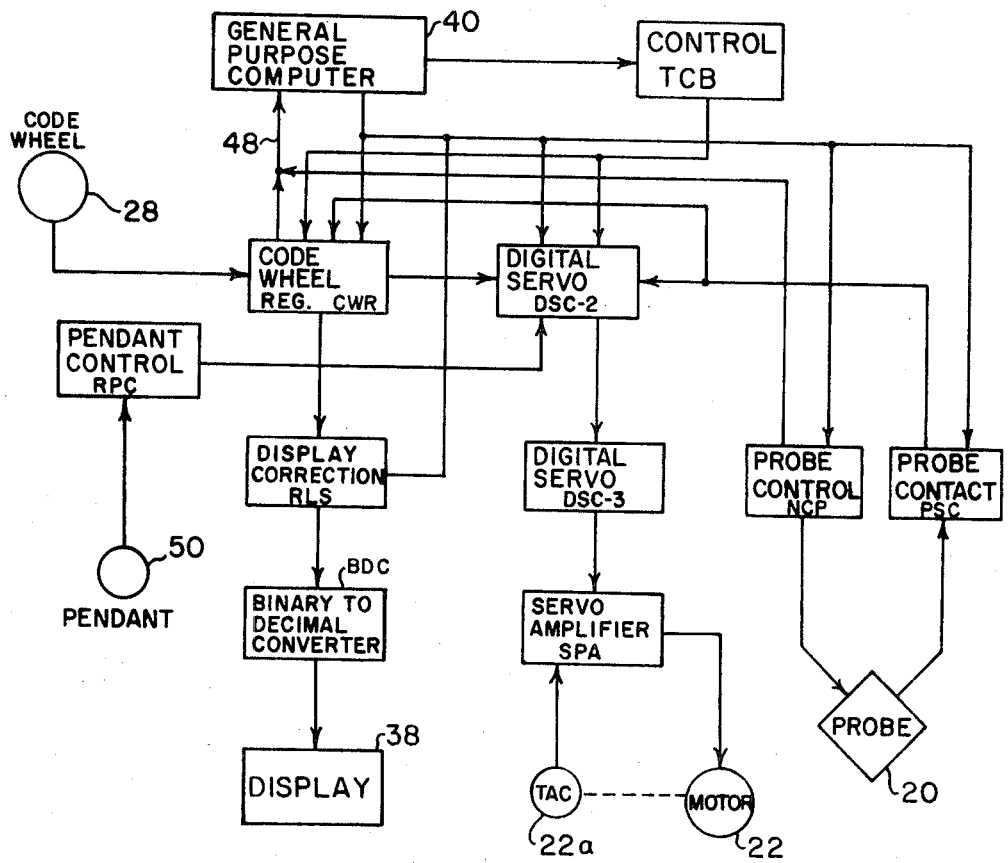
FIG. 2 is a block diagram in greater detail of the control arrangement for one axis of the apparatus of FIG. 1.

Considering now the schematic showing of the overall system illustrated in FIG. 2, the general operation of the system will now be described. Various ones of the components of the system will be described in more detail below. It should be understood that while the complete system includes means for sensing and controlling movement along each of the three axes, the system for only one axis is shown in detail in FIG. 2. Also, certain of the components illustrated in FIG. 2 are common to all of the axis control systems. This will be discussed in greater detail below.

The optical incremental encoder or code wheel 28 provides a pulse for each increment of movement of the layout assembly along the X axis. The increments are of uniform length and may, for example, be 0.00025 inches. It will be understood that the encoder 28 operates in exact synchronization with the movement of the layout device so that a train of pulses is generated by the encoder with the number of pulses produced being in direct proportion to the amount of movement of the layout device in each axis of linear motion. A separate encoder is utilized with each axis of motion.

The pulse output of the encoder 28 is supplied to a register CWR. This code wheel register CWR incorporates an arithmetic register and gating circuitry to effect the algebraic addition of the pulses in the encoder 28 to the previous contents of the register in accordance with the direction of movement of the layout device along the X axis. A further input to the register CWR is supplied from the computer 40. This additional input may serve as a reference signal so that the contents of the register CWR represent the actual position of the contact point of the probe head. The register CWR provides outputs indicating actual position to the computer over line 48, to the digital servo control DSC2, and to the display correction circuit RLS.

The input signal to the display correction circuit RLS produces an output from this circuit to a binary to decimal converter BDC where the signal is converted to supply a digital input to a display device 38 which may, for example, be a NIXIE type display. The device 38 thus furnishes a visual indication of the actual position of the probe head.

Considering now the digital servo control DSC2. The control receives positional information from the register CWR. The servo control DSC2 also receives an input from the computer 40 over the line 52 which input represents a desired increment of movement of the layout device 12 along the X axis. Essentially, the servo control DSC2 forms the algebraic sum of the positional input from the register CWR and the increment of movement input from the computer, stores this sum, and compares it with the updated position as supplied by the register CWR during movement along the X axis. As long as there is a difference between the desired position coordinate as indicated by the stored sum, and actual position as indicated by the current input from the encoder 28 through the code wheel register CWR, the digital servo control DSC2 produces an output signal to the digital servo, digital to analog converter DSC3 which, in turn, supplies an input signal to the servo amplifier SPA. The servo amplifier SPA controls the drive motor 22 to effect the desired movement of the layout device along the X axis. A tachometer 22a provides a feedback signal to the servo amplifier SPA to assure smooth control of the motor 22.

A further input to the digital servo control DSC2 is provided from the remote pendant control RPC. The remote pendant control provides a means for manually controlling the position of the probe, as may be desired when initially setting up the machine to check the tolerances of a particular article. The pendant control RPC includes a joy stick 50 which, when moved in the direction of desired movement of the probe, operates an appropriate linear pulse generator to supply pulses to the digital servo control DSC2 where they represent increments of movement of the probe in the same manner as pulses supplied from the computer.

The system components outlined above provide positional sensing and movement control along one axis. An incremental encoder 28, code wheel register CWR, digital servo control DSC2, analog converter DSC3, servo amplifier SPA, and motor are provided for positional sensing and movement control along each of the remaining two axes. The remaining components shown in FIG. 2 are not duplicated, but rather are used in common in all three axes control systems.

The probe 20 includes a contact tip and sensing means for detecting when the tip has contacted a surface of the object being tested. The signal from the contact detecting means of the probe assembly 20 is supplied to the probe contact circuit PSC which, as a result of the signal, instructs the computer 40 to read the actual position of the probe assembly at contact. As will be described in more detail below in connection with the construction of the probe head assembly 20, the contact portion of the probe may be rotated about its axis. This rotation is controlled by the probe control circuit NCP. The probe control circuit NCP also supplies information to the computer indicating the rotation of the contact portion of the probe.

The overall system illustrated in FIG. 2 also includes a timing control buffer TCB. This buffer governs the operation of the various registers and controls and serves as a buffer for governing transmission of data signals to and from the computer 40. By gating the inputs to the display correction circuit RLS, the timing control buffer TCB permits this display control section, the binary to decimal converter BDC, and the visual display device 38 to be used for all three axes.

CODE WHEEL REGISTER

Referring now to FIG. 3 the code wheel register CWR is illustrated in greater detail. The output signals of the code wheel generator 28 are supplied over lines 28a and 28b to a phase decoder circuit 29. The phase decoder circuit 29 compares the relative phases of the two input signals to determine the direction of movement along the respective axis and generates either an up count or a down count signal over the lines 30a and 30b, respectively, in direct proportion to the amount of movement as indicated by the code wheel 28. The code wheel register includes an up/down counter 30 which receives input pulses in accordance with the operation of the associated incremental encoder so that the counter 30 indicates the actual present position of the layout apparatus relative to the respective axis with which the register CWR is associated. An arithmetic register 32 is in parallel connection with the counter 30. Upon receipt of a "freeze" signal at the input 32a from the computer, the arithmetic register 32 is conditioned to receive the data in the counter 30 at that instant of time, This is necessary in order to preserve the value of a particular point which is of interest, for example, the point at which contact of the probe tip with the surface is sensed. A second arithmetic register 34 is arranged in parallel connection with the register 32 and the second arithmetic register 34 provides a serial data output to the computer. The second arithmetic register 34 thus provides for a buffer to hold the selected data value until the computer is ready to receive this data. The second register 34 also receives an input from the computer over the lines 48a. This input sets the value of the second register 34 to indicate the initial probe tip position relative to a pre-selected reference point so that the output signal 34a to the computer is the current position of the probe tip relative to the reference point. The second register 34 also provides a parallel input over the lines 35 to the up/down counter 30 to set the initial state of this counter at the probe tip position relative to the reference point.

DIGITAL SERVO CONTROL CIRCUIT

The digital servo control circuit DSC2 is shown in more detail in FIG. 4. As was pointed out above, the digital servo control DSC2 receives an input over line 34a from the code wheel register CWR which represents the actual position of the layout assembly. This signal is supplied to a first arithmetic adder 43, which also receives a signal over the line 41 from the computer. The signal over the line 41 indicates the desired probe tip position and the arithmetic adder 43 thus generates a signal on the line 43a which is the algebraic difference between the two input signals and is thus an indication of the amount of offset of the probe from the desired position. This signal over the line 43a is provided to a second adder 45 which also receives an input signal over the line 47 from the pendant control 40. The output signal on the line 45a is thus the algebraic sum of the two signals on the lines 43a and 47 and is an indication of the amount of movement desired for the probe tip along the respective axis. It would be understood that no signal is supplied over the line 47 unless the pendant control 50 is manually operated to effect a shifting of the probe tip position. A third adder 49 combines the signal from the adder 45 over the line 45a and the previously stored signal of the shift register 51 which is supplied over the line 51a. The output of the adder 49 over the line 49a serves to update the shift register 51.

The shift register 51 has an output over the line 51a to the computer, which may be used by the computer to determine the amount of error in position remaining at any point of time. The least significant bits of the shift register are also supplied over the parallel lines 51b to the error and null detector 53. This error detector is used to determine the numerical value of the error remaining in the shift register and provides, over the parallel connections 53b, commands to the motor controls of the digital servo control DSC3. A sign bit is supplied from the register 51 over the line 51c to the error and null detector 53 to indicate the polarity of the data supplied to the digital servo control DSC3.

The linear error and null detector circuit 53 also supplies a command signal over the line 53a to the computer when a null is detected, that is, when the desired point and the actual probe tip position coincide.

When the probe contacts the part being inspected, it transmits a freeze signal over the line 32a to the shift register 51, causing the automatic resetting of this register, thus commanding the machine to position about the currently detected point.

PROBE TIP ASSEMBLY

Figure 5:
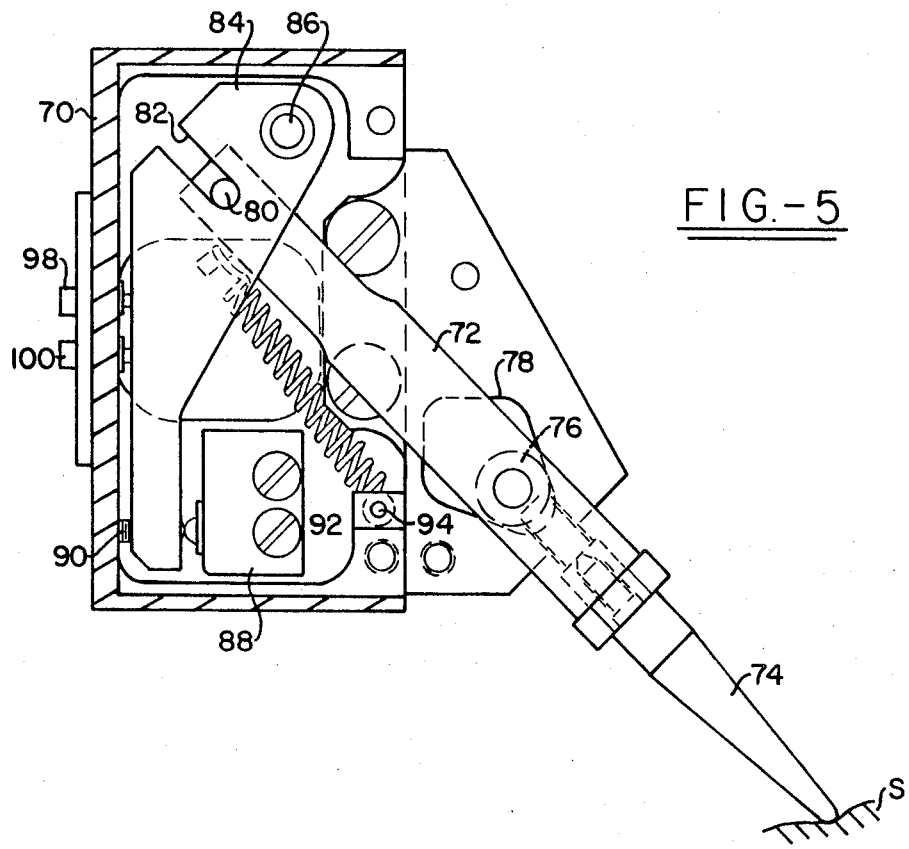
FIG. 5 is an elevational, sectional view of one embodiment of the contact probe head assembly employed in the apparatus of FIG. 1.

One type of probe tip assembly which may be used with the inspection apparatus of the present invention is shown in FIG. 5. This assembly includes a housing 70 in which is received a shank portion 72 of the probe tip. The shank 72 is provided with a replaceable tip 74. The probe shank 72 is free to move within the housing 70, being guided by a ball bearing roller 76 which acts as a cam follower on the walls of an opening 78 in the housing. The upper end of the shank 72 is further guided by a pin 80 received in a slot 82 of a link 84. It should be noted that the sides of the opening 78 which provide guide surfaces for the roller 76 are angled so that the point of the probe tip 74 may move in either a horizontal or a vertical direction. The link 84 is pivotally connected to the housing by a pin 86 and contacts a microswitch 88 at its lower end. A set screw 90 is provided in the lever arm 84 so that the arm may be adjusted to a position where the switch 88 is in its normal closed position when the probe shank 72 and tip 74 are in the position shown in FIG. 5. A spring 92 connected between a pin 94 affixed to the frame and a second pin 96 affixed to the shank normally holds the shank 72 and probe tip 74 in this position. The wires leading from the microswitch 88 are connected to contact pins 98 and 100, respectively.

When the probe tip 74 makes contact with a surface the tip 74 and shank 72 are moved relative to the housing 70. This movement causes the pin 80 to move upwardly in the slot 82 toward the open end thereof, thereby removing the biasing force from the lever arm 84. The arm 84 is thus now free to move by the action of the spring of the microswitch 88, causing the switch to open which indicates that contact has been made between the probe tip 74 and the surface S. Additional movement of the probe tip 74 is permitted to allow for the continued movement of the layout device after tip contact has been sensed due to the inertia of the arm and mechanism carrying same. The additional movement assures that the probe tip will not damage the surface or become bent.

Figure 6:
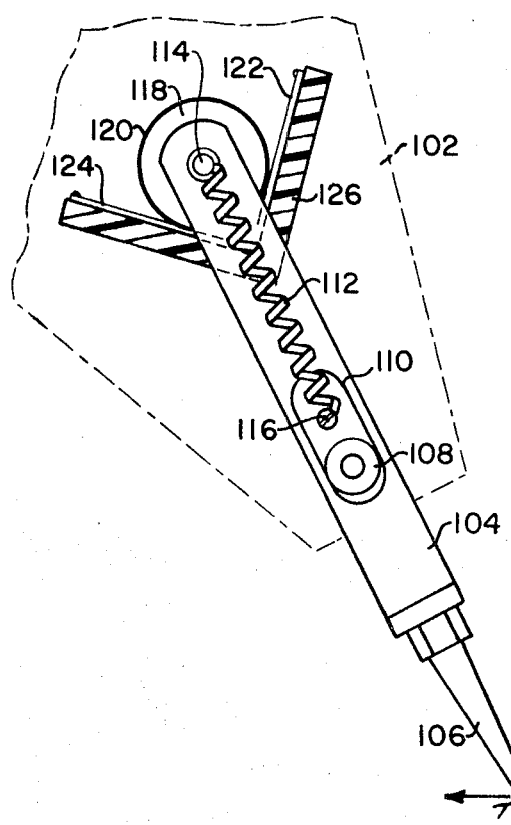
FIG. 6 is an elevational sectional view of a second embodiment of the contact probe head assembly.

A modified form of the probe tip assembly is shown in FIG. 6. In this embodiment there is provided a housing 102, a probe tip shank 104 and a replaceable probe tip 106. The shank 104 is slidable within the housing, being guided by a ball bearing roller 108 received in a slot 110. A spring 112 is connected at one end to the shank by a pin 114 and in its opposite end to the housing by a pin 116 and acts to bias the shank 104 and tip 106 in its fully extended position. The upper or inner end of the shank is provided with a roller 118 which has an electrically conductive coating 120 of, for example, gold. Positioned adjacent the roller 120 and at right angles to one another are two contact surfaces 122 and 124 which may also be gold plated. These surfaces are electrically separated from each other and supported by a suitable mounting member 126. When the probe is in its fully extended position the roller 118 contacts both of the surfaces 122 and 124 thus completing a circuit between these two surfaces. However, upon any inward movement of the probe tip 106 and the shank 104 the roller 118 is moved away from at least one of the two surfaces, breaking contact across the surfaces and indicating that the probe tip 106 has contacted the surface of the object.

PROBE TIP ROTATION CONTROL

As was pointed out previously, the probe tip may be rotated. Normally, this rotation is about the horizontal axis of the arm 18. The apparatus for rotating the probe tip assembly is illustrated in FIG. 7. A housing 128 is affixed to the end of the arm 18. A second housing 130 is journalled on the outer end of the housing 128 by bearings 132 for rotation about the axis of the housing 128. The probe tip assembly housing 70 is mounted to the end of the rotating housing 130. Mounted within the fixed housing 128 is a stepper motor 134 which has a drive pinion 136 driving a gear 138 which, in turn, engages a ring gear 140 carried on the rotating housing 130. The stepper motor 134 is preferably one that rotates in 90° intervals, that is, in four steps per revolution, and the reduction through the gear train 136–138–40 is a 90 to 1 reduction so that the probe assembly is rotated at 1° increments. Rotation of the probe tip extends the usefulness of the assembly since it enables the tip to be positioned so as to most advantageously scan the particular surface of the object being tested. Thus, the probe tip may be rotated to properly scan horizontal surfaces either from the upper or lower side thereof, or to scan a vertical surface, for example.

In order to provide a zero reference point for the probe head assembly there is provided a microswitch 142 which is mounted on the stationary frame 128 and contacted by a pin 144 carried by the stationary frame. The pin 144, in turn, is contacted once for each revolution of the probe head assembly by a pin 146 carried in the rotating housing 130. When the probe head assembly reaches the zero reference point the microswitch 142 is closed by the action of the pin 146 contacting the pin 144. The rear of the drive shaft 148 of the stepping motor 134 carries a hub 150 in which is mounted a permanent magnet 152. Positioned closely adjacent the hub and affixed to the housing 134 is a reed switch 154. It will be seen that this switch is closed once for each revolution of the stepping motor. The reed switch 154 is provided to assure a more accurate determination of the zero reference point and this switch is connected in series with the microswitch 142. It will be seen that the switches 142 and 154 are actuated simultaneously only when the probe tip assembly has rotated precisely to the zero reference point. Thus, while the microswitch 142 may close before the probe has rotated to precisely the reference position due to the limited accuracy of the switch, the reed switch 154 will not close until the stepper motor has rotated to the actual reference points. The two switches 142 and 154 are thus closed only when the probe is at the reference position.

CONTROL PROBE CIRCUIT

Control of the probe tip assembly rotation is achieved by the control probe circuit NCP illustrated in FIG. 8. The probe control circuit NCP includes a first register 61 which receives and stores data from the computer indicating the desired position of the probe, preferably in degrees from the zero reference point. A second register 63 records the actual position of the probe. The data values of the two registers are compared by the arithmetic adder 65 and the difference between these values is computed to determine if the probe has moved to the requested position. The adder 65 determines whether the number in the register is a positive or negative number and determines the direction of rotation of the probe in accordance with this determination. When a difference exists between the data values in the two registers, the probe control circuit NCP actuates the stepper motor to rotate the probe in 1° increments. At the same time, the count is subtracted out of the data in the lower register driving this register to zero. This subtraction being performed by the arithmetic adder 69. When the register reads to zero, the probe has reached the desired position and further movement stops.

Upon an appropriate command from the computer the probe control circuit NCP will cause the probe to rotate until both of the switches 142 and 154 indicating the zero reference position of the probe assembly are actuated. This brings the probe to its zero reference point regardless of its previous position. At the same time, the contents of the first register, indicating actual position of the probe, are reset to indicate that the probe is in zero reference position. This arrangement assures an accurate reference point for determining subsequent positions of the probe and prevents the accumulation of error.

It will be understood that while only the best known embodiments of the invention have been illustrated and described in detail, the invention is not so limited. Reference should therefore be had to the appended claims in determining the true scope of the invention.

What is claimed is:

1. In an automatic inspection apparatus of the type in which a probe is moved along a surface to be inspected by a layout device in response to computer commands, actual probe tip position data being compared to desired tip position data to determine the variation of the surface being inspected from the desired surface, the improvement comprising:
    an encoder for each axis of movement of the layout device generating an electrical signal proportional to the amount of movement of the probe tip along the respective axis;
    a first register associated with each encoder and receiving the signal therefrom, the registers being digital registers and the contents thereof being the present probe position along the respective axis;
    switch means connected to the probe tip for indicating contact of the tip to the surface;
    a second register associated with each first register and operative to receive and store the contents of the respective first register when the switch indicates contact between the probe tip and the surface;
    a shift register in parallel connection with each second register and receiving the data value therefrom, the shift register transmitting the data value serially to the computer, and
    wherein the layout device includes servo motors for effecting movement of the probe along each axis, the motors being controlled by a servo system including a first adder receiving the serial output of the shift register and a computer output indicating desired probe position, the output of the first adder being a measure of probe tip displacement from the desired position, a second adder receiving the first adder output as an input, a second shift register for receiving and storing the output of the second adder, the second shift register being responsive to the switch means to transmit the contents thereof serially to the computer and to the second adder to permit updating of the second shift register, and error detector receiving the least significant bits of the second shift register contents and generating an output signal when all of such bits are at a zero state, and a digital to analog converter receiving the bits from the detector to generate an analog signal for controlling the servo motor of the respective axis of the layout device.

2. The improvement according to claim 1 wherein the probe tip is movable relative to the probe, the switch means being responsive to probe tip movement.

3. The improvement according to claim 2 wherein the probe further includes a body portion attached to the layout device, the tip being slidably received in the body portion, and biasing means for urging the tip portion to its fully extended position.

* * * * *